United States Patent
Sampica et al.

(10) Patent No.: US 8,118,075 B2
(45) Date of Patent: Feb. 21, 2012

(54) SYSTEM AND METHOD FOR DISASSEMBLING LAMINATED SUBSTRATES

(75) Inventors: James D. Sampica, Springville, IA (US); Paul R. Nemeth, Cedar Rapids, IA (US); Tracy J. Barnidge, Marion, IA (US); Vincent P. Marzen, Robins, IA (US)

(73) Assignee: Rockwell Collins, Inc., Cedar Rapids, WI (US)

( * ) Notice: Subject to any disclaimer, the term of this patent is extended or adjusted under 35 U.S.C. 154(b) by 959 days.

(21) Appl. No.: 12/009,372

(22) Filed: Jan. 18, 2008

(65) Prior Publication Data
US 2009/0183615 A1    Jul. 23, 2009

(51) Int. Cl.
*B32B 38/10*  (2006.01)
(52) U.S. Cl. ........ 156/762; 156/711; 156/752; 156/761; 83/15; 83/37; 83/440; 83/651.1; 83/788; 83/794; 83/871; 83/874; 83/907
(58) Field of Classification Search .......... 83/651.1, 83/15, 37, 440, 788, 794, 871, 874, 907; 156/711, 752, 761, 762
See application file for complete search history.

(56) References Cited

U.S. PATENT DOCUMENTS

| | | | |
|---|---|---|---|
| 3,851,758 A | 12/1974 | Makhijani et al. | |
| 5,566,840 A | 10/1996 | Waldner et al. | |
| 5,592,288 A | 1/1997 | Sampica et al. | |
| 5,678,303 A * | 10/1997 | Wichmann | 29/806 |
| 5,918,517 A * | 7/1999 | Malapert et al. | 83/171 |
| 5,950,512 A * | 9/1999 | Fields | 83/171 |
| 6,388,724 B1 | 5/2002 | Campbell et al. | |
| 6,614,057 B2 | 9/2003 | Silvernail et al. | |
| 6,681,668 B1 * | 1/2004 | Smirle | 83/171 |
| 6,803,245 B2 | 10/2004 | Auch et al. | |
| 6,832,538 B1 * | 12/2004 | Hwang | 83/809 |
| 6,984,545 B2 | 1/2006 | Grigg et al. | |

(Continued)

FOREIGN PATENT DOCUMENTS

EP    0556351 B1    6/1995

(Continued)

OTHER PUBLICATIONS

US Office Action for U.S. Appl. No. 12/009,373, mail date Dec. 30, 2009, 14 pages.

(Continued)

*Primary Examiner* — Philip Tucker
*Assistant Examiner* — Nickolas Harm
(74) *Attorney, Agent, or Firm* — Donna P. Suchy; Daniel M. Barbieri

(57) ABSTRACT

An apparatus for separating a laminated substrate assembly comprises at least a substantially planar assembly, a cutting member housing assembly positioned on a first side of the substantially planar assembly, a cutting member receiving assembly positioned on a second side of the substantially planar assembly, substantially opposite from the first side of the planar assembly suitable for receiving an amount of the elongated cutting member. At least one of the cutting member housing assembly or the cutting member receiving assembly is configured to provide an amount of tension to the elongated cutting member as the elongated cutting member is released by the cutting member housing assembly or received by the cutting member receiving assembly, and the elongated cutting member is configured to remove an amount of adhesive from an adhesive layer of the laminated substrate assembly.

15 Claims, 9 Drawing Sheets

U.S. PATENT DOCUMENTS

| | | |
|---|---|---|
| 6,998,648 B2 | 2/2006 | Silvernail |
| 7,273,403 B2 | 9/2007 | Yokota et al. |
| 7,381,110 B1 | 6/2008 | Sampica et al. |
| 7,435,311 B1 | 10/2008 | Marzen et al. |
| 7,452,258 B1 | 11/2008 | Marzen et al. |
| 7,814,676 B2 | 10/2010 | Sampica et al. |
| 2003/0089214 A1* | 5/2003 | Fukuta et al. ............ 83/651.1 |
| 2003/0180528 A1 | 9/2003 | Flosenzier et al. |
| 2005/0126679 A1 | 6/2005 | Kim |
| 2006/0245171 A1 | 11/2006 | Kim et al. |
| 2007/0297736 A1 | 12/2007 | Sherman et al. |
| 2009/0120572 A1 | 5/2009 | Sampica et al. |
| 2009/0120585 A1 | 5/2009 | Sampica et al. |
| 2009/0126872 A1 | 5/2009 | Sampica et al. |
| 2009/0183381 A1 | 7/2009 | Sampica et al. |
| 2009/0186218 A1 | 7/2009 | Sampica et al. |

FOREIGN PATENT DOCUMENTS

| | | |
|---|---|---|
| EP | 0711103 B1 | 3/2000 |
| JP | 1-210328 A | 8/1989 |
| JP | 5-200880 A | 8/1993 |
| JP | 5-293895 A | 11/1993 |
| JP | 6-051484 A | 2/1994 |
| JP | 9-057779 A | 3/1997 |
| JP | 10-156853 A | 6/1998 |
| JP | 10-244589 A | 9/1998 |
| JP | 2000-141388 A | 5/2000 |
| JP | 2004-233590 A | 8/2004 |
| JP | 2006-218658 A | 8/2006 |
| JP | 2006-334912 A | 12/2006 |
| JP | 2007-206559 A | 8/2007 |
| JP | 2008-238607 A | 10/2008 |
| WO | WO 93/05634 | 3/1993 |

OTHER PUBLICATIONS

Notice of Allowance for U.S. Appl. No. 12/009,373, mail date Jun. 16, 2010, 4 pages.
Office Action for U.S. Appl. No. 12/009,472, mail date Jan. 14, 2011, 14 pages.
U.S. Appl. No. 12/009,482, filed Jan. 18, 2008, Sampica et al.
U.S. Appl. No. 12/009,472, filed Jan. 18, 2008, Sampica et al.
U.S. Appl. No. 12/009,393, filed Jan. 18, 2008, Barnidge et al.
U.S. Appl. No. 12/009,375, filed Jan. 18, 2008, Sampica et al.
U.S. Appl. No. 12/009,373, filed Jan. 18, 2008, Sampica et al.
U.S. Appl. No. 11/214,518, filed Aug. 30, 2005, Sampica et al.
Walker, Geoff, GD-Itronix Dynavue Technology, The Ultimate Outdoor-Readable Touch-Screen Display, Rugged PC Review, pp. 1-4, United States of America.

* cited by examiner

US 8,118,075 B2

SYSTEM AND METHOD FOR DISASSEMBLING LAMINATED SUBSTRATES

CROSS-REFERENCE TO RELATED APPLICATIONS

The present application is related to and claims the benefit of earliest available effective filing date(s) from the following listed application(s) (the "Related Applications") (e.g., claims earliest available priority dates for other than provisional patent applications; claims benefits under 35 USC §119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

1. U.S. patent application entitled "ALIGNMENT SYSTEM AND METHOD THEREOF," naming James D. Sampica as the first named inventor, sent via Express Mail Envelope Number EM 117 518 667 US, filed on Jan. 18, 2008, which is currently co-pending, or is an application of which a currently co-pending application is entitled to the benefit of the filing date.
2. U.S. patent application entitled "SUBSTRATE LAMINATION SYSTEM AND METHOD," naming James D. Sampica as the first named inventor, sent via Express Mail Envelope Number EM 117 518 596 US, filed on Jan. 18, 2008, which is currently co-pending, or is an application of which a currently co-pending application is entitled to the benefit of the filing date.
3. U.S. patent application entitled "SUBSTRATE LAMINATION SYSTEM AND METHOD," naming James D. Sampica as the first named inventor, sent via Express Mail Envelope Number EM 117 518 605 US, filed on Jan. 18, 2008, which is currently co-pending, or is an application of which a currently co-pending application is entitled to the benefit of the filing date.
4. U.S. patent application entitled "SYSTEM AND METHOD FOR COMPLETING LAMINATION OF RIGID-TO-RIGID SUBSTRATES BY THE CONTROLLED APPLICATION OF PRESSURE," naming James D. Sampica as the first named inventor, sent via Express Mail Envelope Number EM 117 518 640 US, filed on Jan. 18, 2008, which is currently co-pending, or is an application of which a currently co-pending application is entitled to the benefit of the filing date.
5. U.S. patent application entitled "PLANARIZATION TREATMENT OF PRESSURE SENSITIVE ADHESIVE FOR RIGID-TO-RIGID SUBSTRATE LAMINATION," naming James D. Sampica as the first named inventor, sent via Express Mail Envelope Number EM 117 518 653 US, filed on Jan. 18, 2008, which is currently co-pending, or is an application of which a currently co-pending application is entitled to the benefit of the filing date.

All subject matter of the Related Application and of any and all parent, grandparent, great-grandparent, etc. applications of the Related Applications is incorporated herein by reference to the extent such subject matter is not inconsistent herewith.

TECHNICAL FIELD

The present invention relates generally to laminated substrates. More specifically, the present invention relates to disassembling laminated substrates.

BACKGROUND

Laminated displays are generally constructed for deployment within potentially harsh environments. Features of these harsh environments are high and low ambient temperatures, dust, moisture, vibration, shock and the inevitable risk of abuse by users who are operating under pressure-packed conditions. These challenges can be especially difficult when designing the displays that provide critical user interface functions and also are exposed to a risk of damage. Furthermore, a display may acquire defects during the lamination process or may be damaged by the manufacturer, shipper or user during handling.

When a laminated display has been damaged, the display generally must be discarded and no component parts of the display may be re-utilized. This creates waste and increased expense in acquiring replacement laminated displays.

Consequently, a system and method for separating laminated displays while minimizing the introduction of anomalies to the display is desired.

SUMMARY

According to an embodiment, an apparatus for separating laminated substrates is described. Apparatus may comprise a substantially planar assembly, the substantially planar assembly comprising a plate assembly suitable for receiving a laminated substrate assembly and a guide assembly configured to guide the plate assembly in at least one direction, a cutting member housing assembly positioned on a first side of the substantially planar assembly suitable for containing an elongated cutting member and releasing an amount of the elongated cutting member and a cutting member receiving assembly positioned on a second side of the substantially planar assembly, substantially opposite from the first side of the planar assembly suitable for receiving an amount of the elongated cutting member. At least one of the cutting member housing assembly or the cutting member receiving assembly is configured to provide an amount of tension to the elongated cutting member as the elongated cutting member is released by the cutting member housing assembly or received by the cutting member receiving assembly and the elongated cutting member is configured to remove an amount of adhesive from an adhesive layer of the laminated substrate assembly positioned on a top surface of the plate assembly of the planar assembly as the amount of the elongated cutting member is transferred from the cutting member housing assembly to the cutting member receiving assembly.

According to an additional embodiment, a method for separating laminated substrates is described. Method may comprise providing a planar assembly, placing a laminated substrate assembly on a surface of the planar assembly, determining a position of an adhesive layer of the laminated substrate assembly, providing an elongated cutting member housing assembly configured to house an amount of an elongated cutting member, providing an elongated cutting member receiving assembly configured to receive an amount of the elongated cutting member, positioning an amount of the elongated cutting substantially between two layers of a laminated substrate assembly along a length of the adhesive layer of the laminated substrate assembly, and transferring an amount of elongated cutting member from the cutting member housing assembly to the cutting member receiving assembly by rotating at least one of the cutting member housing assembly or the cutting member receiving assembly to draw the elongated cutting member along the length of the adhesive layer. The amount of elongated cutting member is configured to remove at least a portion of an adhesive as the amount of elongated cutting member is transferred from the cutting member housing assembly to the cutting member receiving assembly.

According to a further additional embodiment of the invention, a system for separating laminated substrates is described. System may comprise a substantially planar assembly. The substantially planar assembly may comprise a surface for receiving a laminated substrate assembly and a separation assembly. The separation assembly may further comprise an elongated cutting member, a cutting member housing assembly and a cutting member receiving assembly suitable for receiving the elongated cutting member. The cutting member housing assembly may be suitable for containing and releasing the elongated cutting member and the cutting member receiving assembly may be suitable for receiving the elongated cutting member. System may further comprise a control assembly for controlling the separation assembly.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The numerous objects and advantages of the present invention may be better understood by those skilled in the art by reference to the accompanying figures in which.

DETAILED DESCRIPTION

Figure 1:
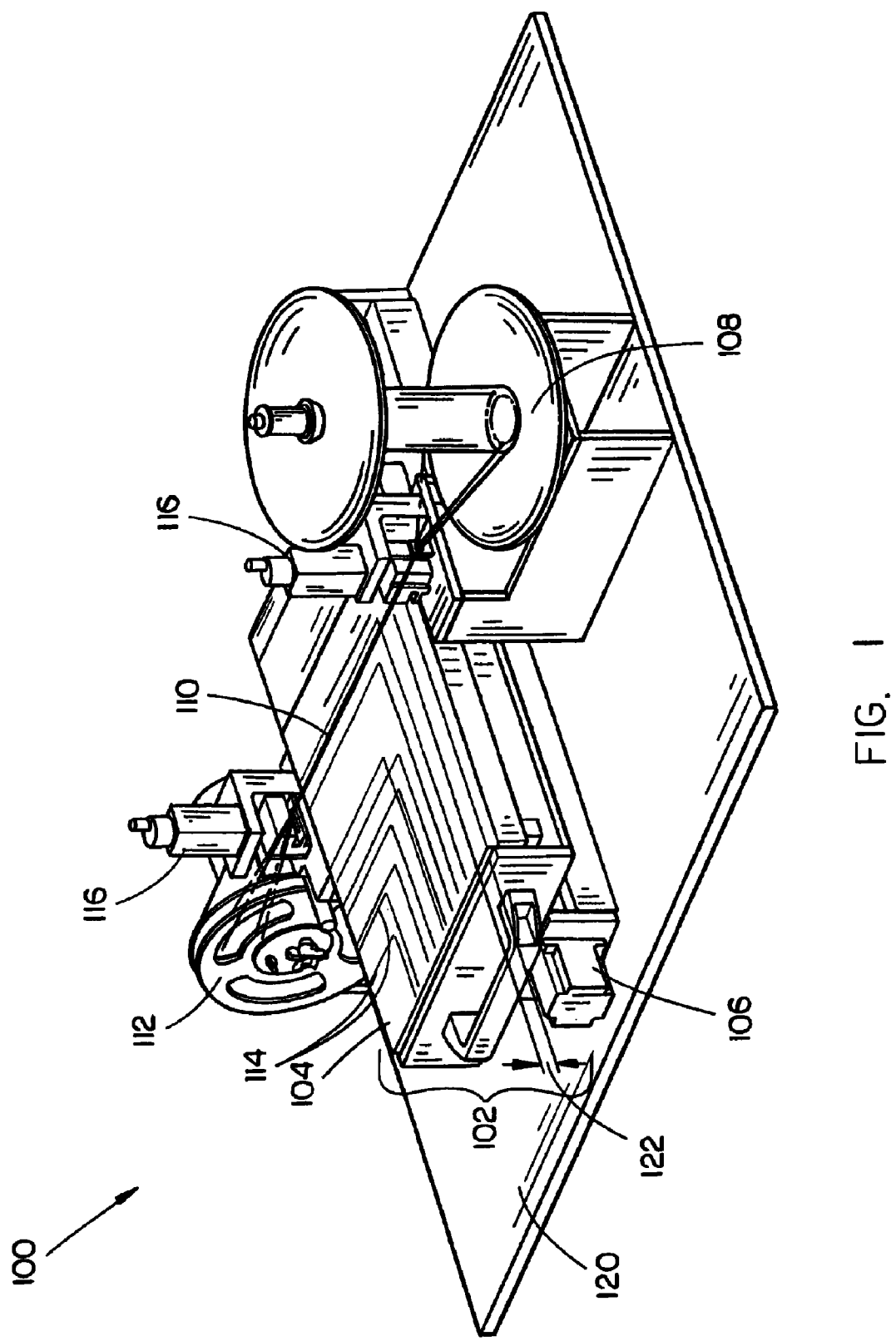
FIG. 1 is an isometric view of an apparatus for separating laminated substrates according to an exemplary embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1-5, an apparatus 100 for separating laminated substrates is described. Apparatus 100 may comprise a substantially planar assembly 102, the substantially planar assembly 102 comprising a plate assembly 104 suitable for receiving a laminated substrate assembly and a guide assembly 106 configured to guide the plate assembly 104 in at least one direction, a cutting member housing assembly 108 positioned on a first side of the substantially planar assembly 102 suitable for containing an elongated cutting member 110 and releasing an amount of the elongated cutting member 110 and a cutting member receiving assembly 112 positioned on a second side of the substantially planar assembly 102, substantially opposite from the first side of the planar assembly 102 suitable for receiving an amount of the elongated cutting member 110. At least one of the cutting member housing assembly 108 or the cutting member receiving assembly 112 is configured to provide an amount of tension to the elongated cutting member 110 as the elongated cutting member 110 is released by the cutting member housing assembly 108 or received by the cutting member receiving assembly 112 and the elongated cutting member 110 is configured to remove an amount of adhesive from an adhesive layer of the laminated substrate assembly positioned on the top surface of the plate assembly 104 of the planar assembly 102 as the amount of the elongated cutting member 110 is transferred from the cutting member housing assembly 108 to the cutting member receiving assembly 112.

Figure 3:
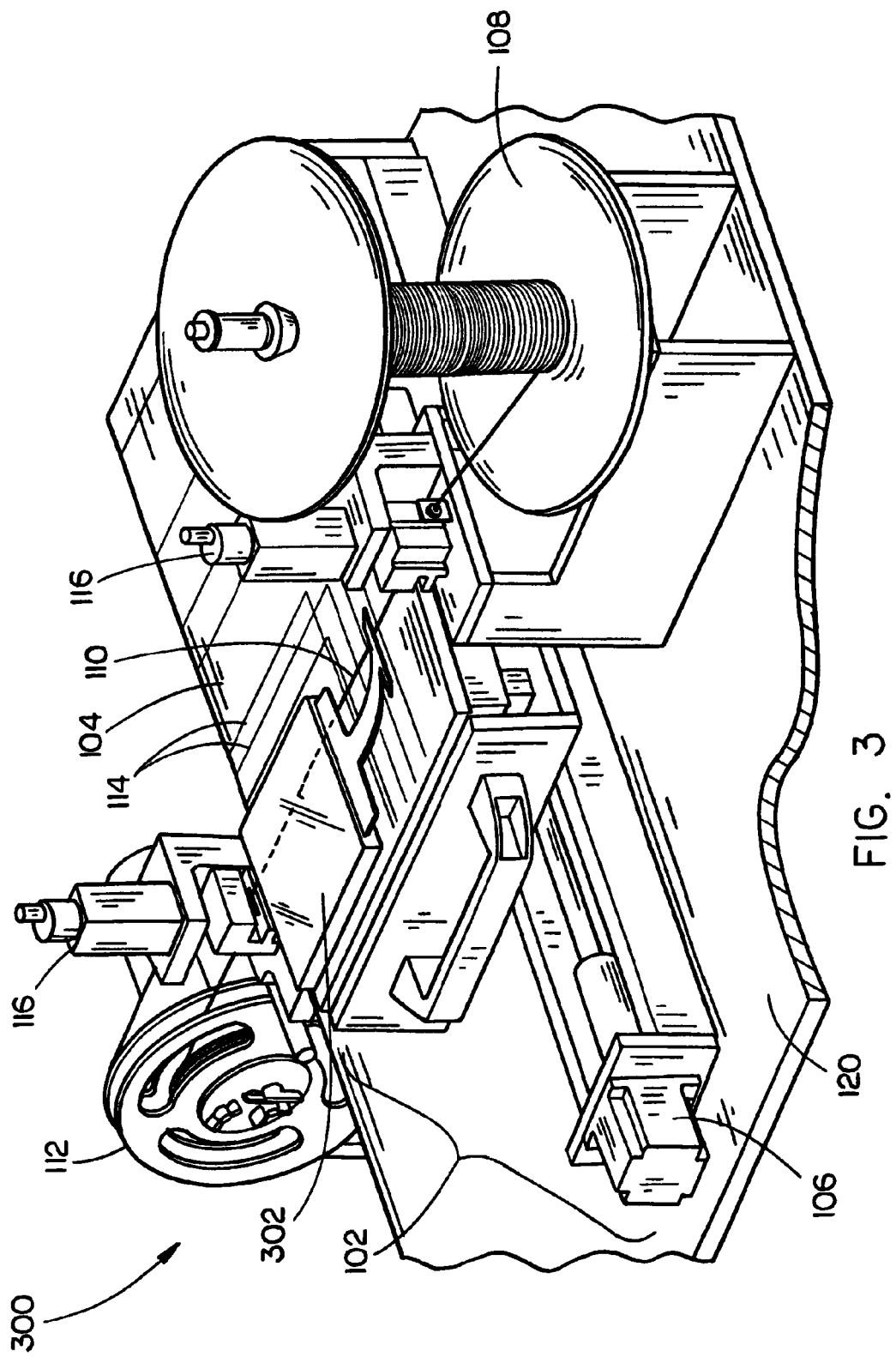
FIG. 3 is a further additional isometric view of an apparatus for separating laminated substrates according to an exemplary embodiment of the present invention.
Figure 4:
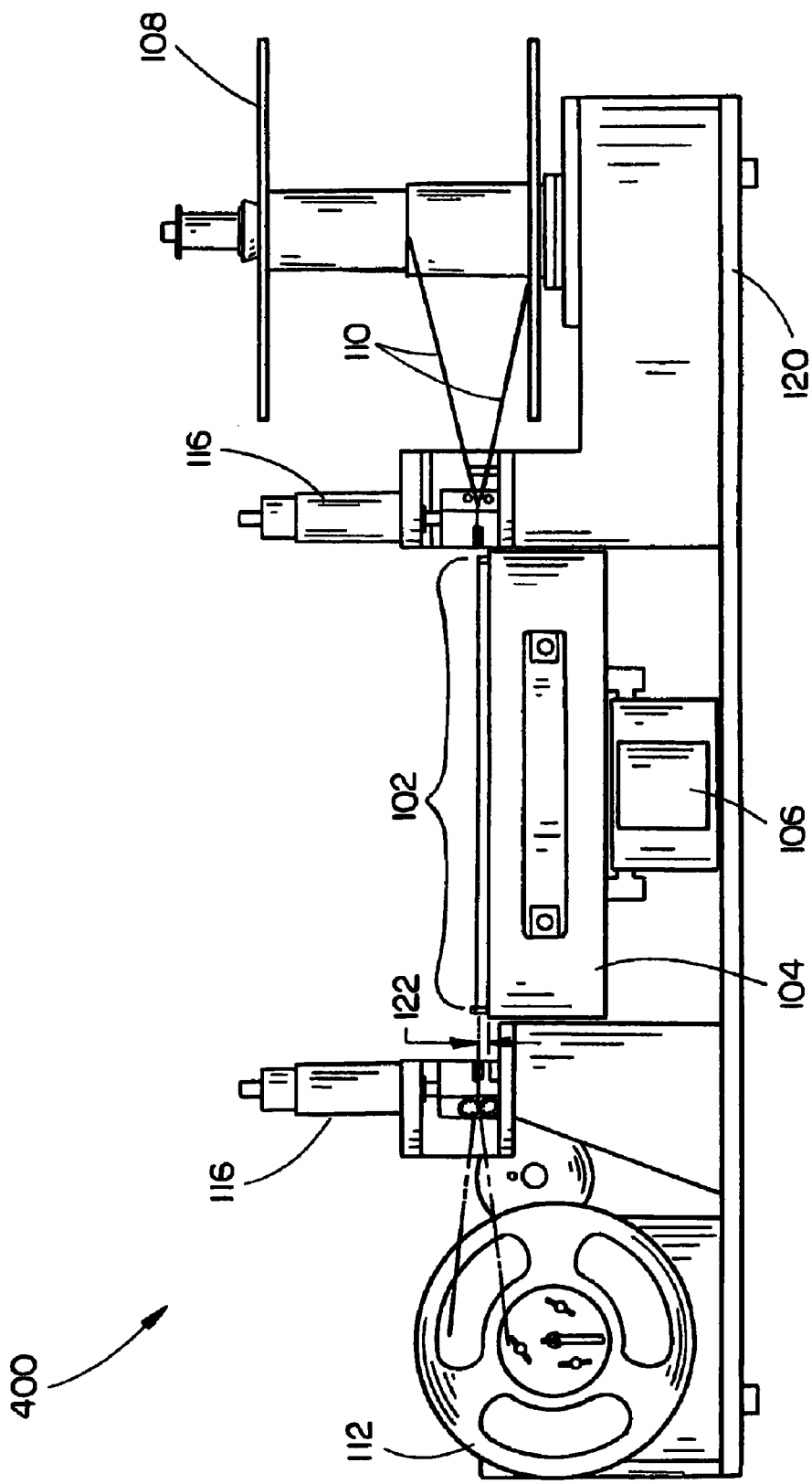
FIG. 4 is a side view of an apparatus for separating laminated substrates according to an exemplary embodiment of the present invention.
Figure 5:
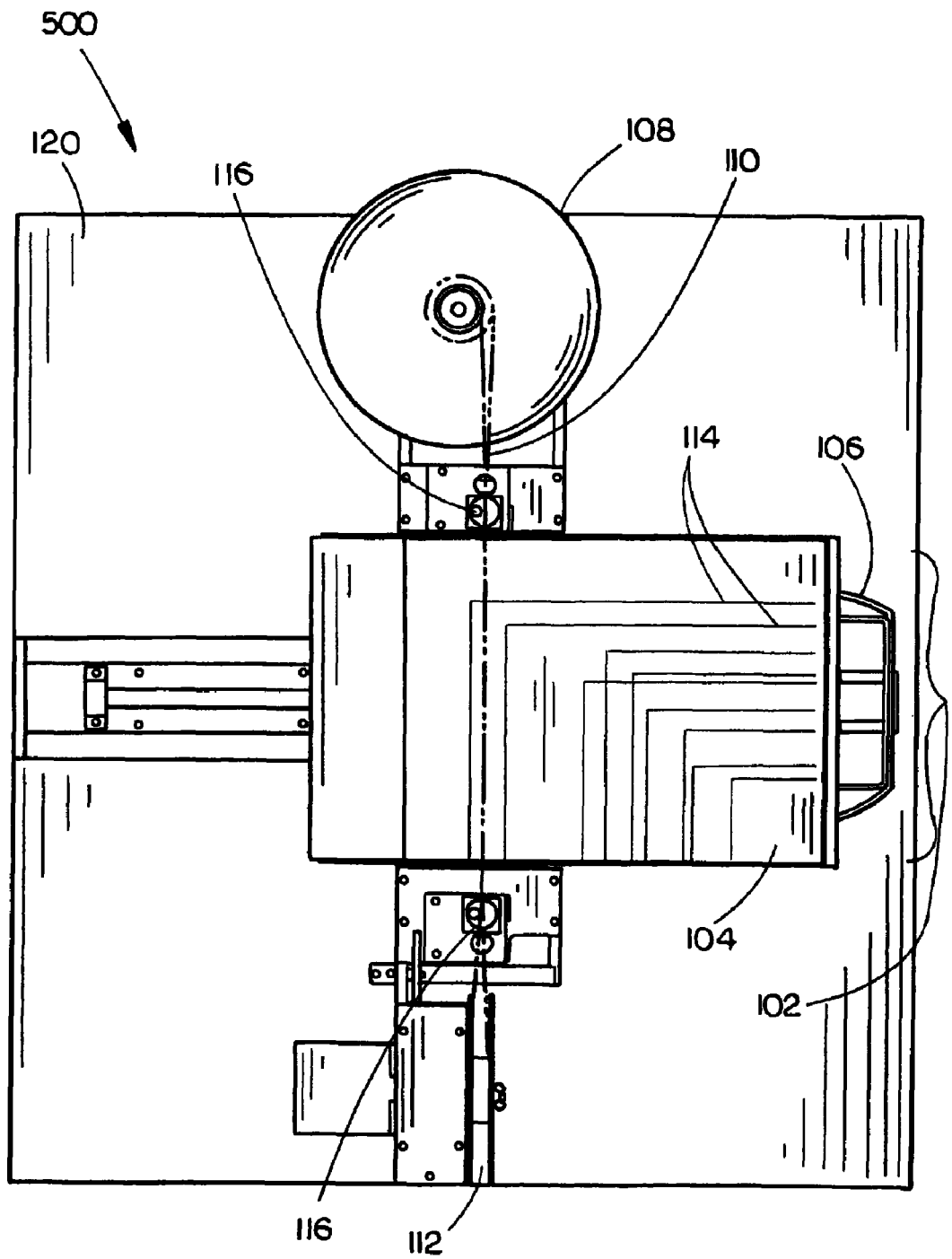
FIG. 5 is a top view of an apparatus for separating laminated substrates according to an exemplary embodiment of the present invention.

Referring to FIG. 3, an example of a laminated substrate assembly 302 is shown on an apparatus 100 for separating a laminated substrate assembly. A "substrate" as used herein may further refer to any rigid or semi-rigid planar surface of glass, plastic, film, and/or metal coated with an adhesive. A laminated substrate assembly 302 may comprise an anti-reflective/anti-glare substrate, a touch panel, a glass substrate, a polarizing film substrate, an LCD, an electrode plane including a conductive coating (e.g., indium-tin oxide) substrate, another glass substrate, and/or another polarizing film substrate. Laminated substrate assembly 302 may be, for example, a conventional display comprising, for example, at least two substrates between which the liquid crystal material is disposed and a third substrate adhered to a top layer of the conventional display. Lines of electrodes may be patterned onto the first and second substrates. A third substrate may be an optically bonded safety/filter glass or touch screen. Adhesive layer may composed of pressure sensitive adhesive, or any adhesive that forms a bond when pressure is applied to marry the adhesive with the adherend. It is contemplated, however, that adhesive layer may be composed of a structural adhesive, i.e., any adhesive that hardens via processes such as evaporation of solvent or water (white glue), reaction with radiation (dental adhesives), chemical reaction (two part epoxy), or cooling, or any combination of structural and pressure sensitive adhesive. The adhesive layer may be composed of have a thickness, for example, from a range of about 20 microns to 3000 microns.

Pressure sensitive adhesive (PSA) may be any adhesive suitable for forming a bond when pressure is applied to engage the adhesive with the adherend. The pressure-sensitive adhesive may be a viscoelastic material utilized in this study, energy dissipation through large-scale bridging effects as well as time-dependent strain-rate effects must be considered.

In one embodiment, as illustrated in FIGS. 1-5, a plate assembly 104 of the planar assembly 102 may be a substantially horizontal surface (e.g. table top). However, it is contemplated that additional embodiments may include a planar assembly 102 including a plate assembly 104 that is substantially convexly or concavely curved (e.g. semi-spherical) or arced, may undulate (e.g. sinusoidally), may be configured to receive corner portions formed at any angle and/or may be customized to receive laminated substrate assemblies formed in any shape or abstract formation. Planar assembly 102 may be composed substantially of metal, metal alloy, heat resistive plastic, ceramic, silicone or any other natural or synthetic material capable of forming a substantially smooth, flat surface. Planar assembly plate assembly 104 may comprise at least one guide marker 114 (e.g. a rectangular outline) formed on or imbedded into a top surface of the plate assembly 104. Guide marker 114 may provide placement or movement guidance for displays of known or predetermined size and shape. Plate assembly top surface may comprise a plurality of guide markers 114 outlining a plurality of laminated substrate display sizes and/or shapes.

The plate assembly 104 of the planar assembly 102 may be configured to receive an amount of heat from a heat source. The heat source is a uniform heat source configured to uniformly heat a region of the plate assembly 104 of the planar assembly 102. For instance, the planar assembly 102 may comprise a plurality of heating mechanisms configured provide substantially uniform heating of the plate assembly 104 of the planar assembly 102. A laminated substrate assembly 302 placed on the plate assembly 104 of the planar assembly 102 may receive heat from the heated plate assembly 104. Heating of the plate assembly 104 of the planar assembly 102, and thus, the laminated substrate assembly 302 may be to a temperature not lower than the softening temperature of the adhesive utilized to bond the substrates.

Guide assembly 106 may be a rail or post along which the plate assembly 104 may glide or move along. Guide assembly 106 may be manually operated or motorized as desired, and may provide substantially linear movement of the plate assembly 104 of the planar assembly 102. In additional embodiments, guide assembly 106 may be configured to match the shape or path determined by the shape of the plate assembly 104.

The elongated cutting member 110 may be a wire or any other such cylindrical, flat and/or otherwise shaped, elongated string of drawn material such as metal, metal alloy, plastic, silicone or any other natural or synthetic material comprising an appropriate tensile strength and suitable to be elongated into string or wire form. The metals suitable for forming an elongated cutting member 110 may include platinum, silver, iron, copper, aluminum and gold.

Figure 2:
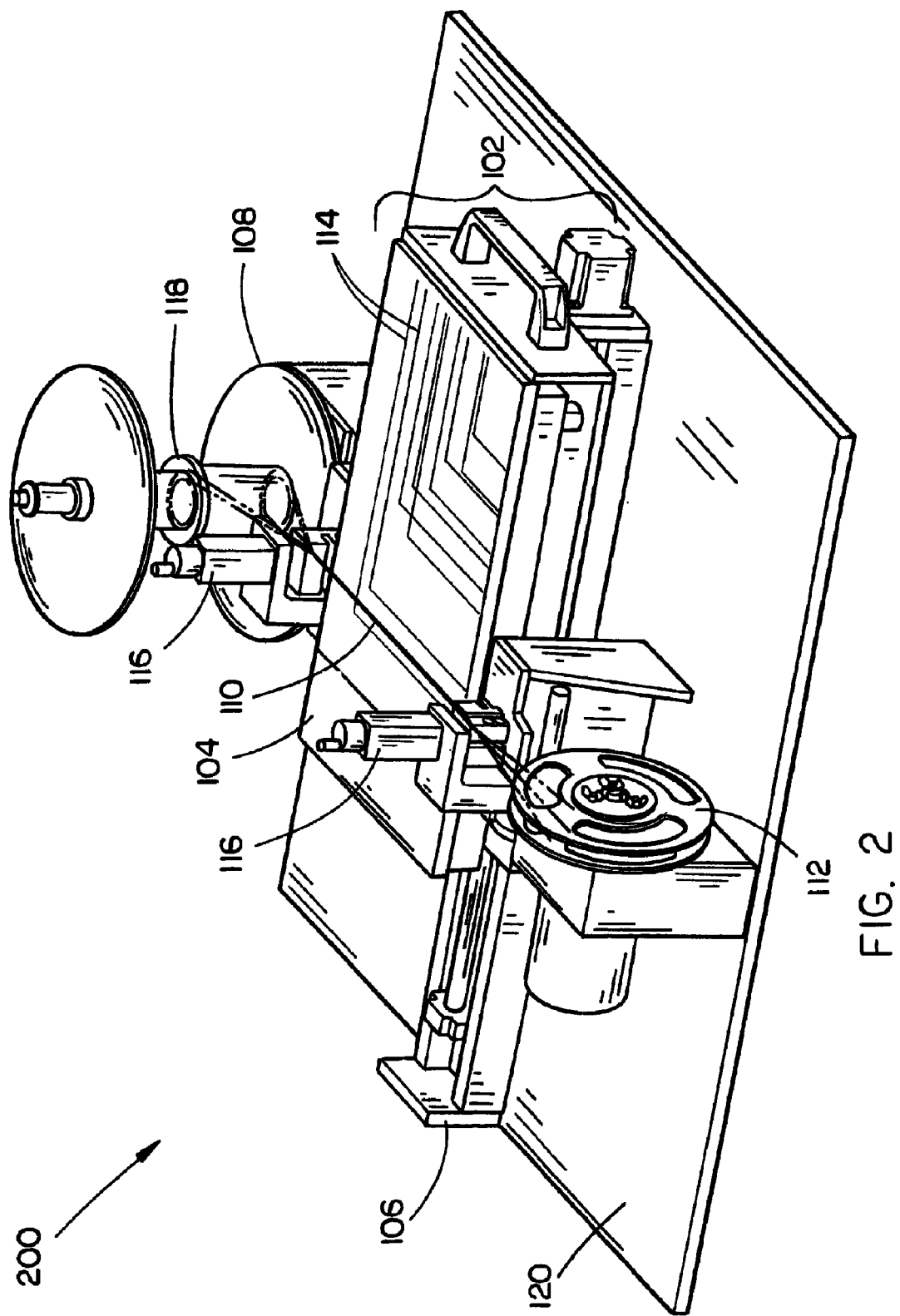
FIG. 2 is an additional isometric view of an apparatus for separating laminated substrates according to an exemplary embodiment of the present invention.

The cutting member housing assembly 108 may be a first hub. In one embodiment, first hub may be substantially cylindrical. For instance, cutting member housing assembly 108 may be a flanged cylinder, reel or other such housing for an amount of an elongated cutting member 110 comprising a flange 118 as shown in FIG. 2, or an unflanged cylinder, reel or other such housing for an amount of an elongated cutting member 110 and on which the elongated cutting member 110 may be wound. However, any shape may be utilized to form the first hub. According to at least one embodiment, at least a portion of the elongated cutting member 110 may be wrapped substantially about the first hub. Cutting member housing assembly 108 may be motorized or manually operated. Cutting member housing assembly 108 may rotate along an axis to release an amount of the elongated cutting member 110 as necessary to maintain elongated cutting member 110 at a desired tautness.

The cutting member receiving assembly 112 may be a second hub configured to receive at least a portion of the elongated cutting member 110. In one embodiment, second hub may be substantially cylindrical. For instance, cutting member receiving assembly 112 may be a flanged or unflanged cylinder or reel on which the elongated cutting member 110 may be wound. However, any shape may be utilized to form the second hub. At least a portion of an elongated cutting member 110 may be configured to wrap substantially about the second hub after at least a portion of the adhesive has been removed from the laminated substrate assembly 302. Cutting member receiving assembly 112 may be motorized or manually operated. Cutting member receiving assembly 112 may rotate along an axis to receive an amount of the elongated cutting member 110 as necessary to maintain elongated cutting member 110 at a desired tautness.

The apparatus 100 may further comprise a calibration assembly 116 configured to calibrate a zero point relative to a top surface of the plate assembly 104 of the planar assembly 102. It is contemplated that a laminated assembly adhesive joint may be at any height relative to a top surface of the plate assembly 104 of the planar assembly 102 when the laminated assembly 302 (FIG. 3) is placed on the top surface of the plate assembly 104 of the planar assembly 102. A calibration assembly 116 may be configured to mark the top surface 104 of the planar assembly 102 as a zero distance point. Calibration assembly 116 may also receive an input relating to a distance from the top surface of the plate assembly 104 (e.g. the zero point) of the planar assembly 102 to the adhesive layer of the laminated substrate assembly 302. Distance input may be manually entered into, for example, a control of the calibration assembly 116 via a keypad or other such device suitable for entering numeric values. The calibration assembly 116 may also be connected to a database of known laminated substrate assembly thicknesses, including a thickness of any individual components of the laminated substrate assembly 302. Calibration assembly 116 may then determine a set point for the elongated cutting member 110 above the top surface 104 of the planar assembly 102. Set point may be, for example, at a distance above the zero point, designated by distance 122 in FIG. 1 and FIG. 4, corresponding with the position of the adhesive layer of the laminated substrate assembly 302 above the top surface 104 of the planar assembly 102. Calibration assembly 116 may be electrically connected to at least one of the cutting member housing assembly 108 and the cutting member receiving assembly 112, and thus may be comprised of at least two separate calibration components (each designated as 116). Each of the calibration assembly 116 components may raise or lower at least a portion of the elongated cutting member 110. A database of known laminated substrate assembly component thicknesses may be utilized by the calibration assembly 116 to determine a set point for the elongated cutting member 110 at a distance above the zero point corresponding with the thickness of any laminated assembly components located below the adhesive layer of the laminated substrate assembly 302 plus any additional amount as desired by an operator.

The apparatus 100 may further comprise an edge assembly (not shown) configured to attach to a top surface of the plate assembly 104 of the planar assembly 102 and guide the laminated substrate in a direction substantially orthogonal to the elongated cutting member 110. Edge assembly may facilitate the application of uniform force to the laminated substrate assembly 302. For instance, as a laminated substrate assembly 302 travels along the planar assembly 102 in a direction orthogonal to the motion of the elongated cutting member 110, the motion may be substantially uniform across the leading edge of the laminated substrate assembly 302 by force applied to a trailing edge of the laminated substrate assembly via the edge assembly.

In an additional embodiment, apparatus 100 may be configured to remove a vertically positioned display. For instance, a planar assembly may comprise a vertical stability assembly configured to apply an amount of pressure to at least two surfaces of a laminated substrate assembly 302 to provide vertical stability for the laminated substrate assembly 302. Cutting assembly may be configured to traverse through an adhesive layer while the laminated substrate assembly 302 is vertically positioned and stationary. In this embodiment, a cutting member housing assembly and a cutting member receiving assembly may be as described above and in FIGS. 1-5 configured to house and receive an elongated cutting member (e.g. a wire), and may further comprise a transport assembly configured to raise or lower the cutting member housing assembly and the cutting member receiving assembly as necessary to traverse through the laminated substrate along the adhesive layer. In some instances, transport assembly may be individually or simultaneously controlled. Transport mechanism may be manual, hydraulic, motorized or comprise any other functional elements necessary to provide movement of at least one of the cutting member housing assembly and/or the cutting member receiving assembly. Transport assembly may also comprise a controller configured to control at least one of speed, distance, elongated cutting member tension, or any other characteristics of the transport assembly. In a further additional embodiment, a planar assembly may comprise a groove or slot suitable for receiving an edge of a laminated substrate assembly 302 to provide vertical stability. A calibration assembly may determine an initial position for the cutting assembly along an adhesive seam of a laminated substrate. Additionally, adhesive seam may be located manually, and cutting assembly may be positioned manually.

Figure 6:
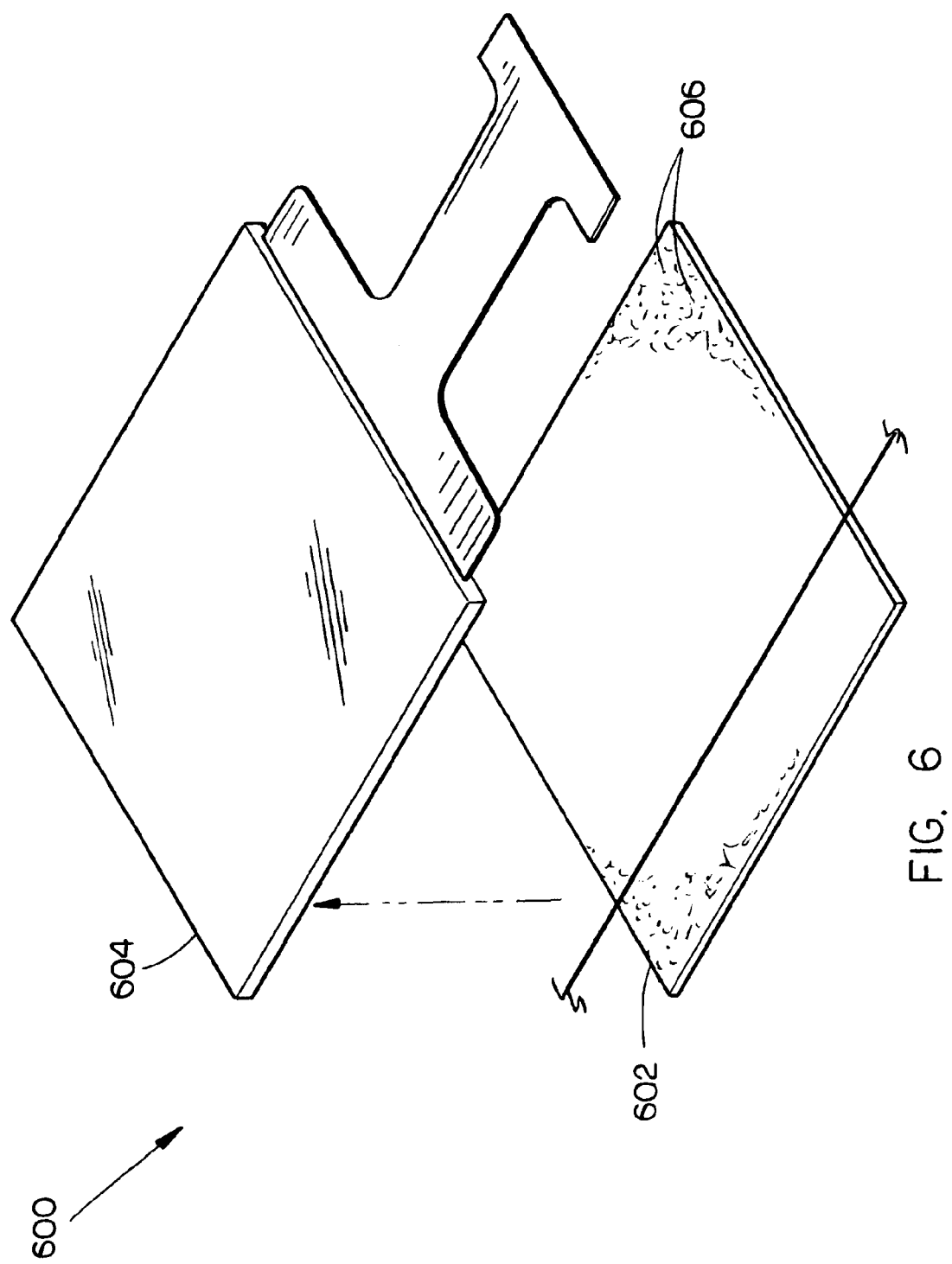
FIG. 6 is an isometric illustration of laminated substrates separated via the apparatus for separating laminated substrates according to an exemplary embodiment of the present invention.

Referring to FIG. 6, an example of a delaminated substrate assembly 600 that has been delaminated via apparatus 100 is shown. Delaminated substrate assembly layers 602, 604, 606 may be any rigid or semi-rigid planar surface of glass, plastic, film, metal, an anti-reflective/anti-glare substrate, a touch panel, a glass substrate, a polarizing film substrate, an LCD, an electrode plane including a conductive coating (e.g., indium-tin oxide) substrate, another glass substrate, and/or another polarizing film substrate. Substrate layers 602, 604 may be different materials, different shapes, different thickness, and/or different sizes. An adhesive layer 606 may be substantially removed between at least two layers (e.g. 602, 604 of FIG. 6) of the delaminated laminated substrate assembly 600. In some instances, at least a portion of an adhesive layer 606 may remain after separation, as shown.

In additional embodiments, an amount of adhesive may be removed from one or more layers of the laminated substrate assembly 302 upon separation. It is contemplated that one or more layers of the laminated substrate assembly 302 may contain an amount of adhesive not removed by the elongated cutting member. Removal of adhesive may be accomplished with water, alcohol, solvent, or any other substance suitable for removing the adhesive from the substrate layer. The material utilized for cleaning the substrate layer may be selected from any appropriate cleaning materials.

Figure 7:
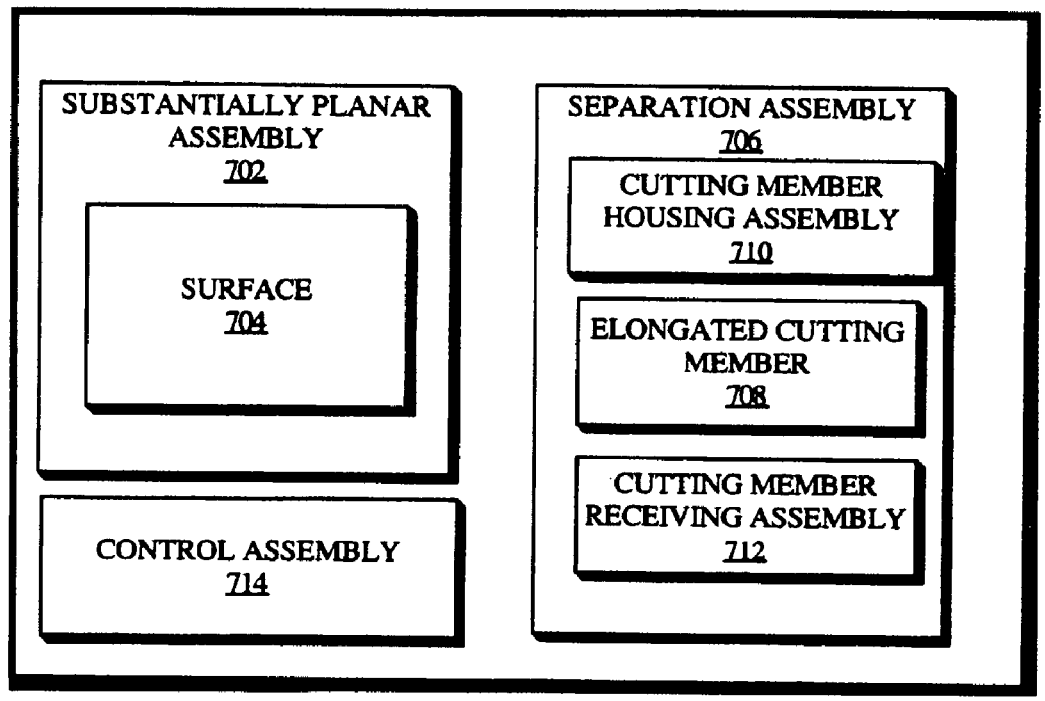
FIG. 7 is a block diagram of a system for separating laminated substrates according to an exemplary embodiment of the present invention

Referring to FIG. 7, a system 700 for separating a laminated substrate assembly is shown. System 700 may comprise a substantially planar assembly 702. The substantially planar assembly may comprise a surface 704 for receiving a laminated substrate assembly and a separation assembly 706. The separation assembly 706 may further comprise an elongated cutting member 708, a cutting member housing assembly 710 and a cutting member receiving assembly 712 suitable for receiving the elongated cutting member. The cutting member housing assembly 710 may be suitable for containing and releasing the elongated cutting member 708 and the cutting member receiving assembly 712 may be suitable for receiving the elongated cutting member 708. System 700 may further comprise a control assembly 714 for controlling the separation assembly 704.

Figure 8:
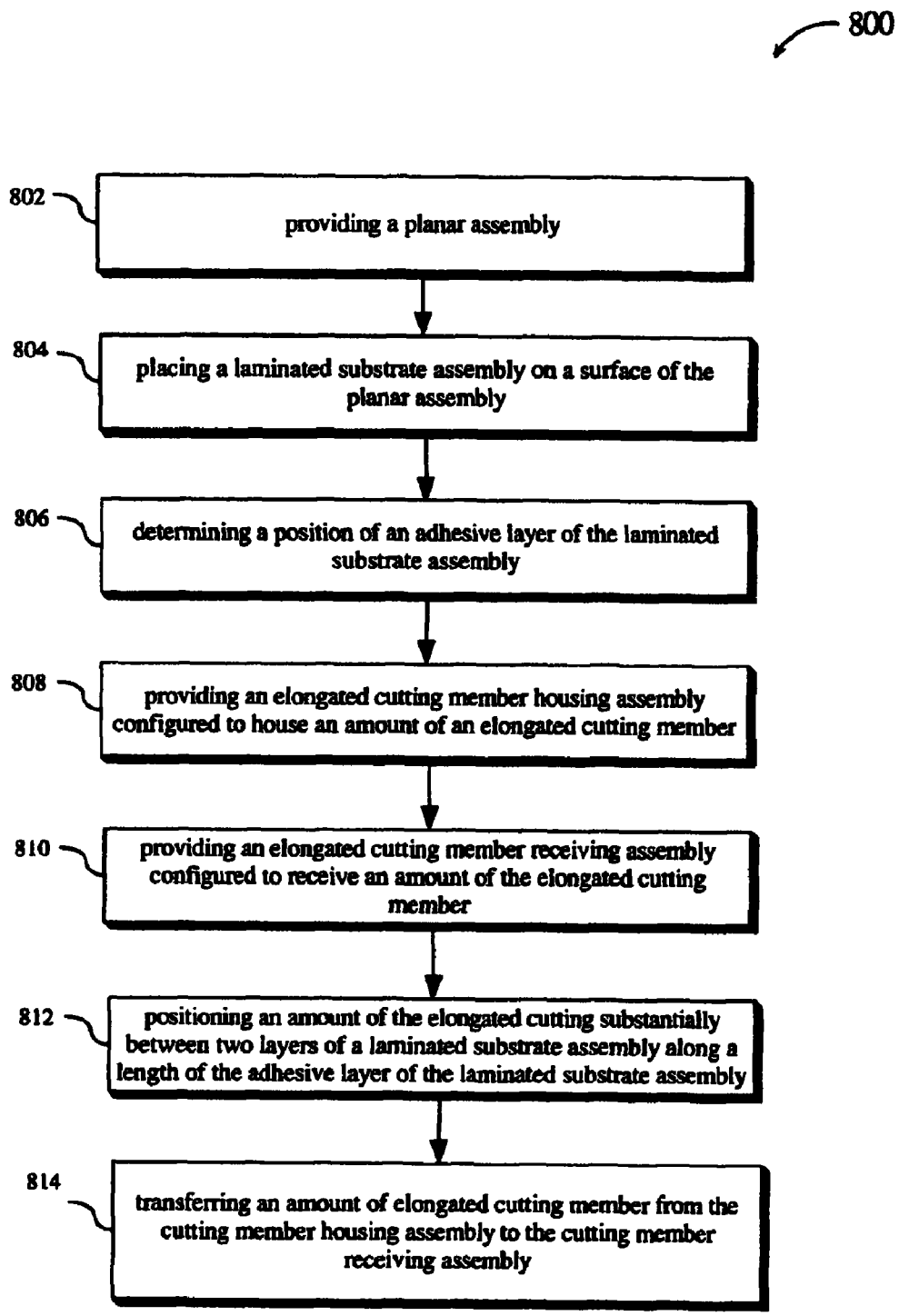
FIG. 8 is a flow diagram of a method for separating laminated substrates according to an exemplary embodiment of the present invention.

Referring to FIG. 8, a method 800 for separating a laminated substrate assembly is shown. Method 700 may comprise providing a planar assembly 802 and placing a laminated substrate assembly on a surface of the planar assembly 804. Method 800 may also comprise determining a position of an adhesive layer of the laminated substrate assembly 806. Method may further comprise providing an elongated cutting member housing assembly configured to house an amount of an elongated cutting member 808 and providing an elongated cutting member receiving assembly configured to receive an amount of the elongated cutting member 810. Method may comprise positioning an amount of the elongated cutting substantially between two layers of a laminated substrate assembly along a length of the adhesive layer of the laminated substrate assembly 812 and transferring an amount of elongated cutting member from the cutting member housing assembly to the cutting member receiving assembly 814. Transfer may be accomplished by rotating at least one of the cutting member housing assembly or the cutting member receiving assembly. Such rotation may draw the elongated cutting member along the length of the adhesive layer. The amount of elongated cutting member is configured to remove at least a portion of an adhesive as the amount of elongated cutting member is transferred from the cutting member housing assembly to the cutting member receiving assembly.

Figure 9:
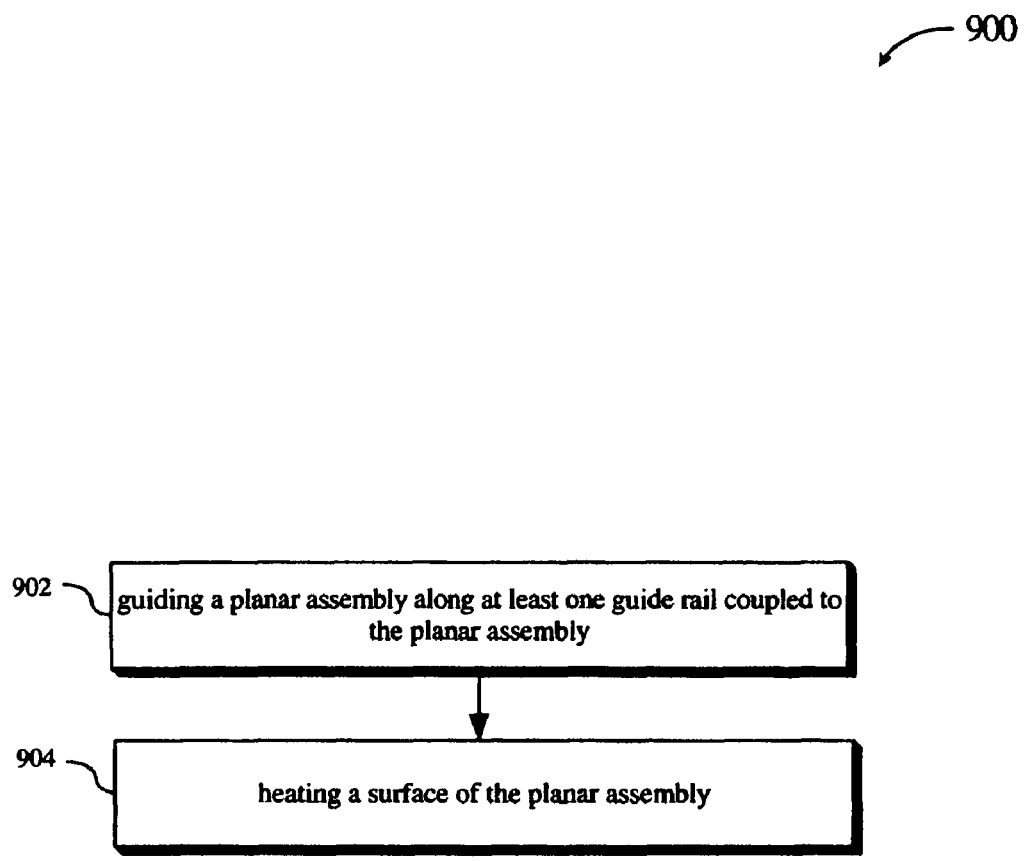
FIG. 9 is an additional flow diagram of a method for separating laminated substrates according to an exemplary embodiment of the present invention.

Referring to FIG. 9, a flow diagram representing an additional method 900 for separating a laminated substrate assembly is shown. Method 900 may comprise guiding a planar assembly along at least one guide rail coupled to the planar assembly 902 and heating a surface of the planar assembly 904. Heating of a surface of the planar assembly may occur before, during or after the laminated substrate assembly has been placed on the surface of the planar assembly 904. Method may be implemented with method 800 and one or more steps of method 900 may be implemented before or after any step of method 800.

Systems and apparatuses in accordance with various aspects of the present invention provide a system and method for dissembling laminated substrates. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein. Furthermore, although the invention is frequently described herein as pertaining to displays composed of one or more substrates, it will be appreciated that the systems and methods described herein could also be applied to any substrates adhered with any adhesive including, but not limited to, a pressure sensitive adhesive.

It is understood that the specific order or hierarchy of steps in the foregoing disclosed methods are examples of exemplary approaches. Based upon design preferences, it is understood that the specific order or hierarchy of steps in the method may be rearranged while remaining within the scope of the present invention. The accompanying method claims present elements of the various steps in a sample order, and are not meant to be limited to the specific order or hierarchy presented.

Various embodiments of the present invention include one or more techniques described below relating to separating laminated substrates. Each of these techniques may be implemented using standard user interface techniques, such as standard graphical software programming or the like. Of course any programming language or environment could be used to implement the techniques described herein. Furthermore, the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for separating a laminated substrate assembly comprising:
   a planar assembly, the planar assembly comprising a plate assembly for receiving a laminated substrate assembly and a guide assembly configured to guide the plate assembly in at least one direction;
   an elongated cutting member;
   a cutting member housing assembly positioned on a first side of the planar assembly suitable for containing the elongated cutting member and releasing an amount of the elongated cutting member; and
   a cutting member receiving assembly positioned on a second side of the planar assembly, substantially opposite from the first side of the planar assembly suitable for receiving an amount of the elongated cutting member; and
   a heating assembly coupled to the planar assembly configured to uniformly heat a surface of the plate assembly;
   wherein at least one of the cutting member housing assembly or the cutting member receiving assembly is configured to provide an amount of tension to an amount of the elongated cutting member as the amount of elongated cutting member is released by the cutting member housing assembly or received by the cutting member receiving assembly, and the elongated cutting member is configured to remove an amount of adhesive from an adhesive layer of the laminated substrate assembly positioned on a top surface of the plate assembly of the planar assembly as the amount of the elongated cutting member is transferred from the cutting member housing assembly to the cutting member receiving assembly.

2. The apparatus of claim 1, wherein the guide assembly guides the plate assembly in a substantially forward direction as the amount of the elongated cutting member is transferred from the cutting member housing assembly to the cutting member receiving assembly.

3. The apparatus of claim 1, wherein the elongated cutting member is a cylindrical shaped member.

4. The apparatus of claim 1, wherein the cutting member housing assembly is a first hub.

5. The apparatus of claim 4, wherein at least a portion of the elongated cutting member is wrapped about the first hub.

6. The apparatus of claim 5, wherein the first hub is configured to provide an amount of tension for the elongated cutting member.

7. The apparatus of claim 1, wherein the cutting member receiving assembly is a second hub configured to receive at least a portion of the elongated cutting member.

8. The apparatus of claim 7, wherein the second hub is configured to provide an amount of tension for the elongated cutting member.

9. The apparatus of claim 7, wherein the at least a portion of the elongated cutting member is configured to wrap about the second hub after at least a portion of the adhesive has been removed from the laminated substrate assembly.

10. The apparatus of claim 1, wherein the planar assembly is configured to align the laminated substrate in a direction orthogonal to the elongated cutting member.

11. The apparatus of claim 1, further comprising a calibration assembly configured to calibrate a zero point for the separation assembly relative to the planar assembly.

12. The apparatus of claim 1, further comprising a plate assembly configured to attach to the planar assembly and guide the laminated substrate in a direction orthogonal to the elongated cutting member.

13. The apparatus of claim 1, further comprising a controller for controlling at least one of the speed and tension of the elongated cutting member.

14. An apparatus for separating a laminated substrate assembly comprising:
   a planar assembly, the planar assembly comprising a plate assembly for receiving a laminated substrate assembly and a guide assembly configured to guide the plate assembly in at least one direction;
   a cutting member housing assembly positioned on a first side of the planar assembly suitable for containing an elongated cutting member and releasing an amount of the elongated cutting member; and
   a cutting member receiving assembly positioned on a second side of the planar assembly, substantially opposite from the first side of the planar assembly suitable for receiving an amount of the elongated cutting member;
   a heating assembly coupled to the planar assembly and configured to uniformly heat a surface of the plate assembly;
   wherein at least one of the cutting member housing assembly or the cutting member receiving assembly is configured to provide an amount of tension to an amount of the elongated cutting member as the amount of elongated cutting member is released by the cutting member housing assembly or received by the cutting member receiving assembly, and the elongated cutting member is configured to remove an amount of adhesive from an adhesive layer of the laminated substrate assembly positioned on a top surface of the plate assembly of the planar assembly as the amount of the elongated cutting member is transferred from the cutting member housing assembly to the cutting member receiving assembly.

15. The apparatus of claim 14, further comprising the elongated cutting member; wherein the elongated cutting member is a cylindrical-shaped cutting member.

* * * * *